(12) United States Patent
Guo et al.

(10) Patent No.: US 10,409,539 B2
(45) Date of Patent: Sep. 10, 2019

(54) METHOD, APPARATUS AND TERMINAL DEVICE FOR DISPLAYING APPLICATION MESSAGE

(71) Applicant: TENCENT TECHNOLOGY (SHENZHEN) COMPANY LIMITED, Shenzhen (CN)

(72) Inventors: Yongzhi Guo, Shenzhen (CN); Jing He, Shenzhen (CN); Yu Chen, Shenzhen (CN); Zengxiang Lv, Shenzhen (CN); Bin Li, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 155 days.

(21) Appl. No.: 15/311,835

(22) PCT Filed: Jun. 12, 2015

(86) PCT No.: PCT/CN2015/081299
§ 371 (c)(1),
(2) Date: Nov. 16, 2016

(87) PCT Pub. No.: WO2015/188773
PCT Pub. Date: Dec. 17, 2015

(65) Prior Publication Data
US 2017/0083269 A1    Mar. 23, 2017

(30) Foreign Application Priority Data

Jun. 12, 2014 (CN) .......................... 2014 1 0261986

(51) Int. Cl.
*G06F 3/14* (2006.01)
*G06F 9/451* (2018.01)
(Continued)

(52) U.S. Cl.
CPC ............ *G06F 3/14* (2013.01); *G06F 3/04842* (2013.01); *G06F 9/451* (2018.02); *H04L 67/26* (2013.01)

(58) Field of Classification Search
CPC ...................................... G06F 3/14; G06F 3/17
(Continued)

(56) References Cited

U.S. PATENT DOCUMENTS

2006/0036941 A1*  2/2006 Neil .................. G06F 9/451
                                                          715/234
2006/0085758 A1    4/2006 Backus
(Continued)

FOREIGN PATENT DOCUMENTS

CN    101155360 A    4/2008
CN    102955688 A    3/2013
(Continued)

OTHER PUBLICATIONS

The World Intellectual Property Organization (WIPO) International Searh Report for PCT/CN2015/081299 dated Sep. 18, 2015 pp. 1-3.
(Continued)

*Primary Examiner* — Ruay Ho
(74) *Attorney, Agent, or Firm* — Anova Law Group, PLLC (57) ABSTRACT

A method, an apparatus, and a terminal device for displaying an application message are provided. The method includes: extracting a logic controller that controls application message sending and receiving from an application; determining the extracted logic controller as a common controller object of the application and a desktop; creating a desktop instance object corresponding to the common controller object; and loading and displaying a set user interface component on the desktop by using the desktop instance object, and when the application has a new application message, displaying the
(Continued)

new application message in the set user interface component by pulling the new application message by the logic controller. Embodiments of the present invention enable a user to view a new application message on the desktop more conveniently, and reduce power consumption of the terminal device.

14 Claims, 8 Drawing Sheets

(51) Int. Cl.
*G06F 3/0484* (2013.01)
*H04L 29/08* (2006.01)

(58) Field of Classification Search
USPC ........ 715/234, 753, 800; 700/83; 340/407.1; 711/159; 719/311
See application file for complete search history.

(56) References Cited

U.S. PATENT DOCUMENTS

| | | | | |
|---|---|---|---|---|
| 2007/0179646 | A1* | 8/2007 | Dempski | G06Q 10/10 700/83 |
| 2010/0257539 | A1* | 10/2010 | Narayanan | G06F 9/44526 719/311 |
| 2012/0290972 | A1* | 11/2012 | Yook | G06F 3/0482 715/800 |
| 2012/0326853 | A1* | 12/2012 | Reponen | G06F 1/1626 340/407.1 |
| 2014/0173227 | A1* | 6/2014 | Min | G06F 3/0644 711/159 |

FOREIGN PATENT DOCUMENTS

| | | |
|---|---|---|
| CN | 103064732 A | 4/2013 |
| CN | 103064735 A | 4/2013 |
| CN | 103078788 A | 5/2013 |
| CN | 103677788 A | 3/2014 |
| CN | 104020929 A | 9/2014 |
| WO | 2014000255 A1 | 1/2014 |

OTHER PUBLICATIONS

The State Intellectual Property Office of the People's Republic of China (SIPO) Office Action 1 for 201410261986.8 dated Jul. 29, 2016 pp. 1-9.

* cited by examiner

METHOD, APPARATUS AND TERMINAL DEVICE FOR DISPLAYING APPLICATION MESSAGE

CROSS-REFERENCE TO RELATED APPLICATION

This application claims priority to PCT Application No. PCT/CN2015/081299, filed on Jun. 12, 2015, which claims priority to a Chinese patent application No. 201410261986.8, filed on Jun. 12, 2014, the content of all of which is incorporated herein by reference in their entirety.

FIELD OF THE TECHNOLOGY

The present disclosure generally relates to the field of data processing technologies, and in particular relates to a method, an apparatus and a terminal device for displaying an application message.

BACKGROUND OF THE DISCLOSURE

With the popularity of smart operating systems such as Android and iOS, a growing number of applications are installed in a terminal device (such as a smart phone and a tablet), and in order to enable users to get application messages more conveniently, most of these applications have the application message pushing function. By using the application message pushing function, application message sending and receiving may be implemented among multiple terminal devices by using applications installed therein including, for example, terminal devices social networking services (SNS) applications and instant messaging applications.

Currently, if a terminal device receives a new application message and needs to display the application message, the current interface of the terminal device needs to be switched to an application interface to display the application message. In this case, a user needs to manually switch the current interface of the terminal device to the application interface for displaying the application message, which is a relatively complex operation for the user and results in high power consumption of the terminal device.

SUMMARY

In view of the above, embodiments of the present disclosure provide a method, an apparatus and a terminal device for displaying an application message, so as to solve the existing problem that a user needs to manually switch a current interface of a terminal device to an application interface for displaying the application message, which is a relatively complex operation for the user and results in high power consumption of the terminal device.

A method for displaying an application message includes:
extracting a logic controller that controls application message sending and receiving from an application;
determining the extracted logic controller as a common controller object of the application and a desktop;
creating a desktop instance object corresponding to the common controller object; and
loading and displaying a set user interface component on the desktop by using the desktop instance object, and when the application has a new application message, displaying the new application message in the set user interface component by pulling the new application message by the logic controller.

An embodiment of the present invention further provides an apparatus for displaying an application message, including:
a first extracting module, configured to extract a logic controller that controls application message sending and receiving from an application;
a common object determination module, configured to determine the extracted logic controller as a common controller object of the application and a desktop;
a first creating module, configured to create a desktop instance object corresponding to the common controller object;
a first loading module, configured to load and display a set user interface component on the desktop by using the desktop instance object; and
a first displaying module, configured to, when the application has a new application message, display the new application message in the set user interface component by pulling the new application message by the logic controller.

An embodiment of the present invention further provides a terminal device, including the foregoing apparatus for displaying an application message.

Based on the foregoing technical solutions, in the method for displaying an application message according to the embodiments of the present invention, a logic controller that controls application message sending and receiving may be extracted from an application, the logic controller is determined as a common controller object of the application and a desktop, and to display an application message on the desktop, only a desktop instance object corresponding to the common controller object needs to be created, and by using the desktop instance object, a set user interface component is loaded and displayed on the desktop, and when the application has a new application message, by pulling the new application message by the logic controller, the new application message is displayed in the set user interface component. As a result, the new application message is displayed on the desktop. Compared with conventional methods that a user needs to manually switch to an application interface to display an application message, in embodiments of the present invention, when an application has a new application message, the new application message may be displayed on the desktop without any switching operation, which significantly simplifies the user operation and reduces power consumption of the terminal device. Embodiments of the present invention enable a user to view a new application message on the desktop more conveniently and reduce power consumption of the terminal device.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

Figure 1:
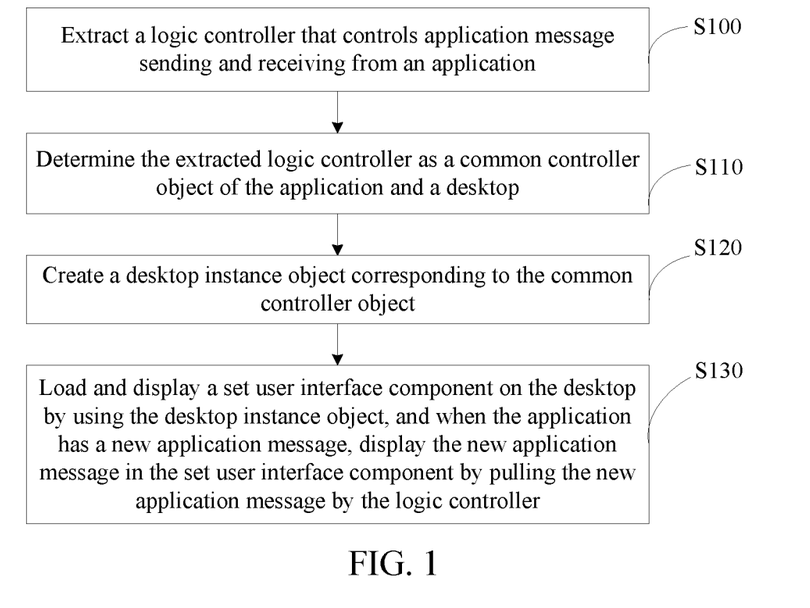
FIG. 1 illustrates a flowchart of a method for displaying an application message according to an embodiment of the present invention.

FIG. 1 is a flowchart of a method for displaying an application message according to an embodiment of the present invention, which may be applied to a terminal device with an application installed therein that can perform application message sending and receiving. Referring to FIG. 1, the method may include the following steps.

Step S100: Extract a logic controller that controls application message sending and receiving from an application.

Optionally, according to the model view controller (MVC) configuration concept, an application usually has a functional module that controls application message sending and receiving, such as a friend messaging module in an SNS application. In the embodiment of the present invention, extraction processing may be performed on a logic controller of a functional module that controls application message sending and receiving, so that the logic controller that controls application message sending and receiving is extracted from the application.

The logic controller according to the embodiment of the present invention refers to a logic controller that can initiate a network request, pull an application message (such as SNS data), and refresh and display the pulled application message on a UI layer according to activities triggered by a user.

Step S110: Determine the extracted logic controller as a common controller object of the application and a desktop.

Step S120: Create a desktop instance object corresponding to the common controller object.

It should be noted that, the inventor finds that the desktop and the application belong to different activities; therefore, in order to display an application message on the desktop and in an application (such as an SNS application), generally, one set of data control logic that controls application message sending and receiving needs to be implemented on the desktop and another set of data control logic that controls application message sending and receiving needs to be implemented in the application. However, in the embodiment of the present invention, by extracting a logic controller that controls application message sending and receiving from an application and determining the extracted logic controller as a common controller object of the application and the desktop, the desktop and the application may share common components of one set of data control logic that controls application message sending and receiving. Therefore, the complex operation that one set of data control logic that controls application message sending and receiving needs to be implemented on the desktop and another set of data control logic that controls application message sending and receiving needs to be implemented in the application is avoided.

In the embodiment of the present invention, for displaying an application message on the desktop and/or in an application, only an instance object corresponding to the common controller object needs to be created on the desktop or in the application, and then the instance object is applied for displaying the application message. As a result, the displaying an application message on the desktop or in the application is implemented. Step S130 shows the process of applying the desktop instance object.

Step S130: Load and display a set user interface component on the desktop by using the desktop instance object, and when the application has a new application message, display the new application message in the set user interface component by pulling the new application message by the logic controller.

The set user interface (UI) herein may be selected based on actual requirements, for example, a view of the UI of an application is selected. Obviously, other customized UI components may also be selected.

In the method for displaying an application message according to the embodiment of the present invention, a logic controller that controls application message sending and receiving may be extracted from an application, the logic controller is determined as a common controller object of the application and a desktop, and to display an application message on the desktop, only a desktop instance object corresponding to the common controller object needs to be created, and by using the desktop instance object, a set user interface component is loaded and displayed on the desktop, and when the application has a new application message, by pulling the new application message by the logic controller, the new application message is displayed in the set user interface component. As a result, the new application message is displayed on the desktop. Compared with conventional methods that a user needs to manually switch to an application interface to display an application message, in embodiments of the present invention, when an application has a new application message, the new application message may be displayed on the desktop without any switching operation, which significantly simplifies the user operation and reduces power consumption of the terminal device. The embodiment of the present invention enables a user to view a new application message on the desktop more conveniently, and reduces power consumption of the terminal device.

Figure 2:
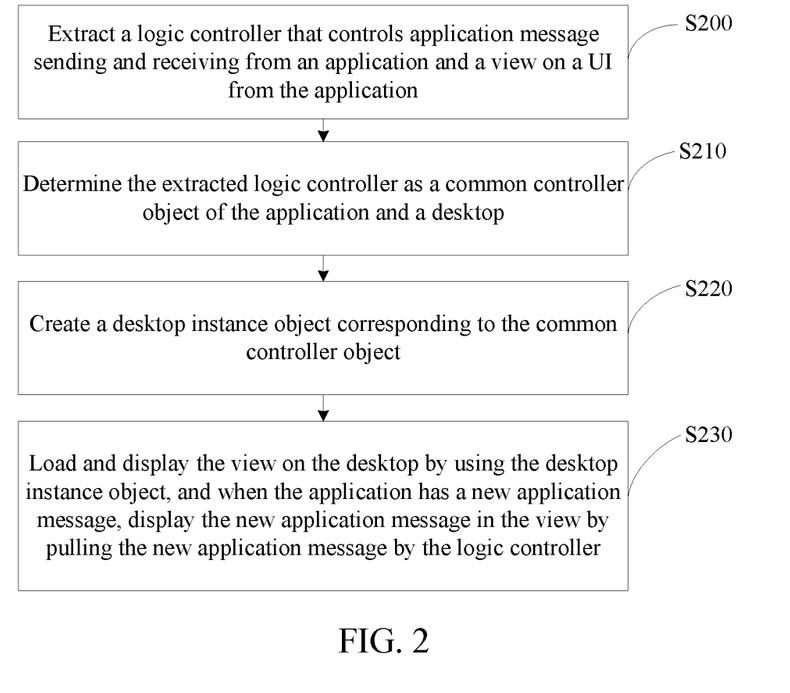
FIG. 2 illustrates another flowchart of a method for displaying an application message according to an embodiment of the present invention.

Optionally, as described above, a set UI component may be a view on a UI of an application, correspondingly, the view may be extracted at the time when the logic controller is extracted, and loaded at the time when the instance object of the common controller object is applied. Optionally, FIG. 2 is another flowchart of a method for displaying an application message according to an embodiment of the present invention. Referring to FIG. 2, the method includes the following steps.

Step S200: Extract a logic controller that controls application message sending and receiving from an application and a view on a UI from the application.

Step S210: Determine the extracted logic controller as a common controller object of the application and a desktop.

Step S220: Create a desktop instance object corresponding to the common controller object.

Step S230: Load and display the view on the desktop by using the desktop instance object, and when the application has a new application message, display the new application message in the view by pulling the new application message by the logic controller.

Optionally, the exemplary Step of loading and displaying a set UI component on the desktop by using the desktop instance object may be: loading and displaying the set UI component on the desktop by invoking an inflate method. It should be noted that the inflate method is a method for finding a layout defined in an Extensible Markup Language (XML) file in the Android system.

Optionally, when the application has a new application message, the exemplary Step of displaying the new application message in the set UI component by pulling the new application message by the logic controller may be: performing data exchange with a network background by using a network component, and when a new application message exists, pulling the new application message by the logic controller, and refreshing and displaying the new application message in the set UI component by a UI refreshing controller. Optionally, the UI refreshing controller may be a Handler UI. When the logic controller pulls a new application message, the new application message may be called back to the Handler UI by an eventcenter, and then the Handler UI sends the new application message called back by the eventcenter to the set UI component for refreshing and displaying.

Figure 3:
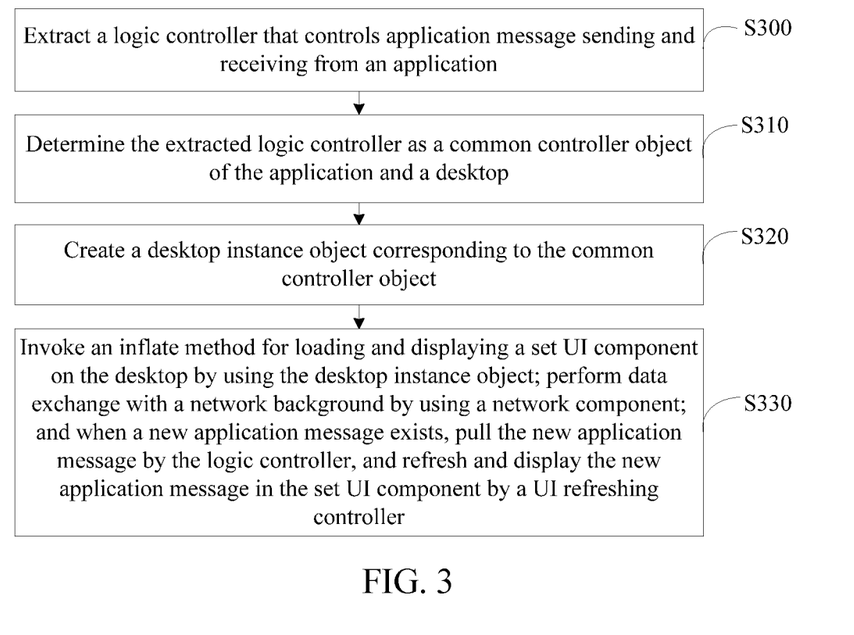
FIG. 3 illustrates still another flowchart of a method for displaying an application message according to an embodiment of the present invention.

Optionally, FIG. 3 is still another flowchart of a method for displaying an application message according to an embodiment of the present invention. Referring to FIG. 3, the method includes the following steps.

Step S300: Extract a logic controller that controls application message sending and receiving from an application.

Step S310: Determine the extracted logic controller as a common controller object of the application and a desktop.

Step S320: Create a desktop instance object corresponding to the common controller object.

Step S330: Invoke an inflate method for loading and displaying a set UI component on the desktop by using the desktop instance object; perform data exchange with a network background by using a network component; and when a new application message exists, pull the new application message by the logic controller, and refresh and display the new application message in the set UI component by a UI refreshing controller.

Figure 4:
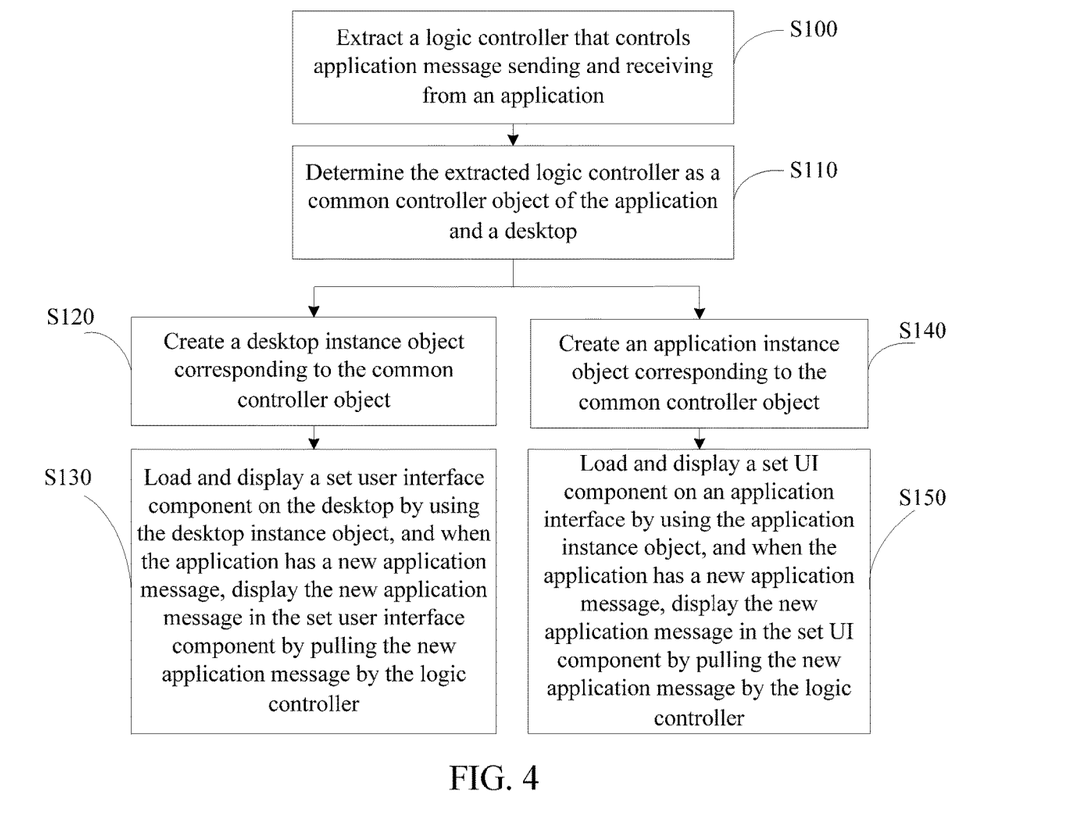
FIG. 4 illustrates yet another flowchart of a method for displaying an application message according to an embodiment of the present invention.

Optionally, to display an application message on an application interface (such as an application interface of an SNS application or a non-SNS application), an instance object corresponding to the common controller object may also be created, and by applying the instance object, the application message may be displayed on the application interface. Correspondingly, FIG. 4 is yet another flowchart of a method for displaying an application message according to an embodiment of the present invention. Referring to FIG. 1 and FIG. 4, on the basis of FIG. 1, the method of FIG. 4 further includes the following steps.

Step S140: Create an application instance object corresponding to the common controller object.

Step S150: Load and display a set UI component on an application interface by using the application instance object, and when the application has a new application message, display the new application message in the set UI component by pulling the new application message by the logic controller.

Optionally, the principle of displaying an application message on the application interface is similar to that of displaying an application message on the desktop, which is not described again herein.

Optionally, when the desktop instance object or application instance object corresponding to the common controller object is created, in the embodiment of the present invention, the desktop instance object corresponding to the common controller object may be created by invoking a preset method for creating a controller according to program encapsulation; and optionally, the preset method for creating a controller may be the new controller ( ) method. In the embodiment of the present invention, the instance object of the common controller object may be created by invoking the new controller ( ) method.

In the embodiment of the present invention, by using the common controller object, only an instance object corresponding to the common controller object needs to be created on the desktop or in the application separately to obtain the UI component to be displayed, where the desktop or the application acts as only a container, and the UI component is loaded into its container for displaying; meanwhile, in the embodiment of the present invention, when a new application message exists, the application message may be pulled from the network by the logic controller, and the new application message is sent to the UI component for refreshing and displaying. As a result, the application message is displayed in the UI component.

Optionally, in the embodiment of the present invention, an interface for actively refreshing application messages may be configured, and the interface may trigger the logic controller to pull the application message from the network. Specifically, in the embodiment of the present invention, a functional key corresponding to the interface for refreshing application messages may be displayed on the display interface of the terminal device, and a user may trigger the functional key to actively refresh the application message, so as to trigger the logic controller to pull the application message from the network; correspondingly, after the new message is pulled, the pulled application message may be displayed in the set UI component.

The embodiment of the present invention enables a user to view a new application message on the desktop more conveniently, and reduces power consumption of the terminal device.

The following describes an apparatus for displaying an application message according to an embodiment of the present invention, and cross-reference may be made to the apparatus for displaying an application message described below and the method for displaying an application message described above.

Figure 5:
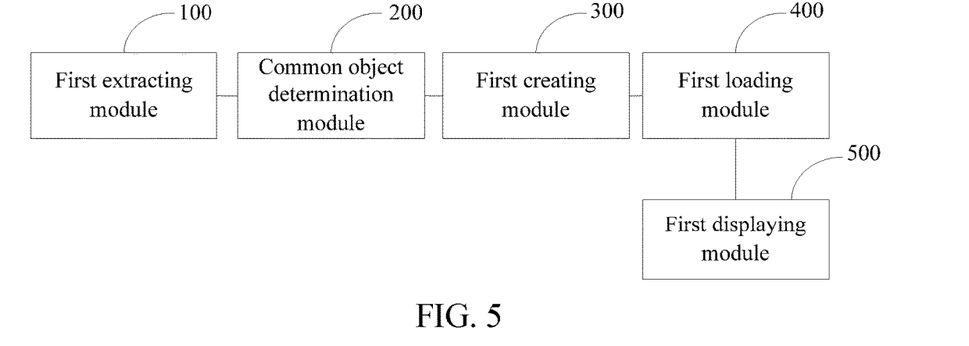
FIG. 5 illustrates a structural block diagram of an apparatus for displaying an application message according to an embodiment of the present invention.

FIG. 5 is a structural block diagram of an apparatus for displaying an application message according to an embodiment of the present invention, where the apparatus may be applied to a terminal device with an application installed therein that can perform application message sending and receiving. Referring to FIG. 5, the apparatus may include:

a first extracting module 100, configured to extract a logic controller that controls application message sending and receiving from an application;

a common object determination module 200, configured to determine the extracted logic controller as a common controller object of the application and a desktop;

a first creating module 300, configured to create a desktop instance object corresponding to the common controller object;

a first loading module 400, configured to load and display a set UI component on the desktop by using the desktop instance object; and a first displaying module 500, configured to, when the application has a new application message, display the new application message in the set UI component by pulling the new application message by the logic controller.

Figure 6:
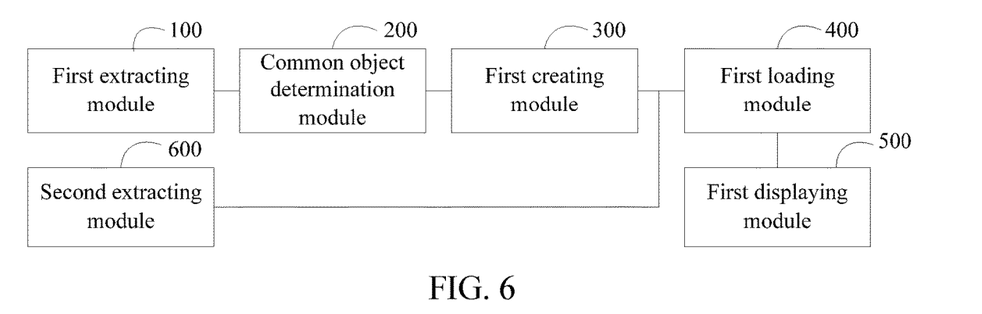
FIG. 6 illustrates another structural block diagram of an apparatus for displaying an application message according to an embodiment of the present invention.

Optionally, the set UI component may be a view on the UI of the application; and optionally, FIG. 6 is another structural block diagram of an apparatus for displaying an application message according to an embodiment of the present invention. Referring to FIG. 5 and FIG. 6, the apparatus for displaying an application message may further include: a second extracting module 600, configured to extract a view on a UI from the application.

Figure 7:
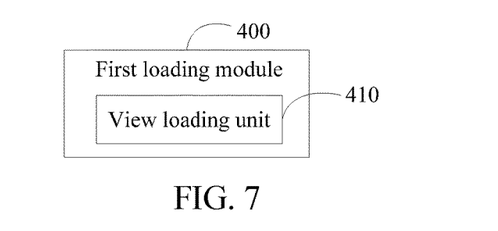
FIG. 7 illustrates a structural block diagram of a first loading module according to an embodiment of the present invention.

On the basis of the second extracting module 600 shown in FIG. 6, FIG. 7 shows an optional structure of the first loading module 400 according to an embodiment of the present invention. Referring to FIG. 7, the first loading module 400 may include: a view loading unit 410, configured to load and display the view on the desktop.

Figure 8:
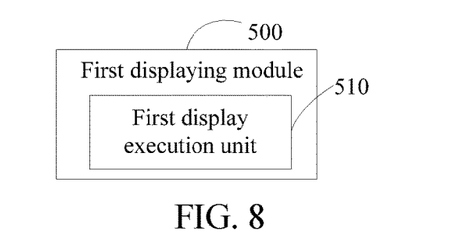
FIG. 8 illustrates a structural block diagram of a first displaying module according to an embodiment of the present invention.

FIG. 8 shows an optional structure of the first displaying module 500 according to an embodiment of the present invention. Referring to FIG. 8, the first displaying module 500 may include: a first display execution unit 510, configured to perform data exchange with a network background by using a network component, and when a new application message exists, display the new application message in the set UI component by pulling the new application message by the logic controller and by refreshing the new application message by a UI refreshing controller.

Figure 9:
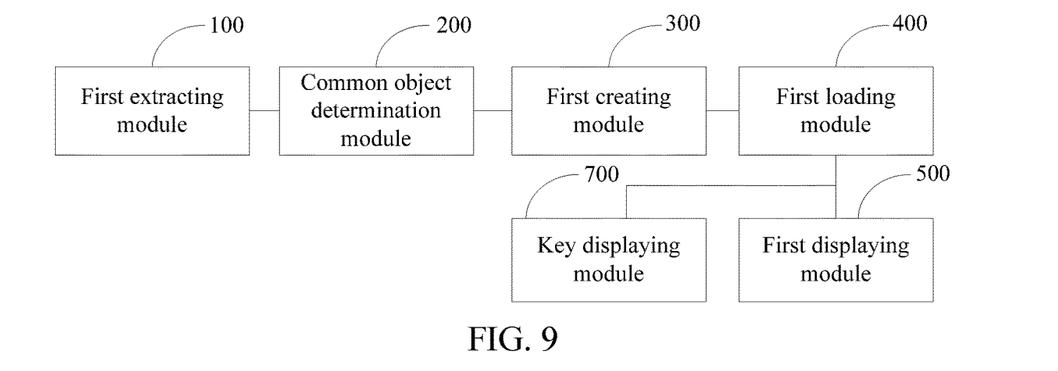
FIG. 9 illustrates another structural block diagram of an apparatus for displaying an application message according to an embodiment of the present invention.

Optionally, an interface for actively refreshing application messages may be configured, and the interface may trigger the logic controller to pull the application message from the network; correspondingly, FIG. 9 is another structural block diagram of an apparatus for displaying an application message according to the embodiment of the present invention. Referring to FIG. 5 and FIG. 9, the apparatus for displaying an application message may further include: a key displaying module 700, configured to display a functional key corresponding to an interface for refreshing application messages after the set UI component is loaded and displayed on the desktop.

Figure 10:
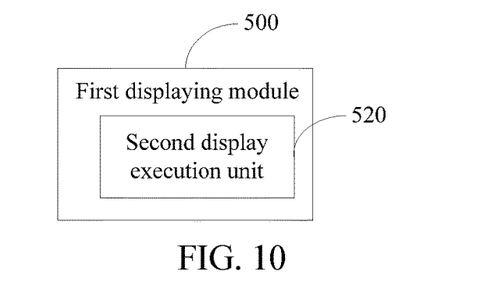
FIG. 10 illustrates another structural block diagram of a first displaying module according to an embodiment of the present invention.

Correspondingly, on the basis of the key displaying module 700 shown in FIG. 9, FIG. 10 shows another optional structure of the first displaying module 500 according to the embodiment of the present invention. Referring to FIG. 10, the first displaying module 500 may include: a second display execution unit 520, configured to, when the functional key is triggered, trigger the logic controller to pull the application message from the network, and after the new application message is pulled, display the pulled application message in the set UI component.

Figure 11:
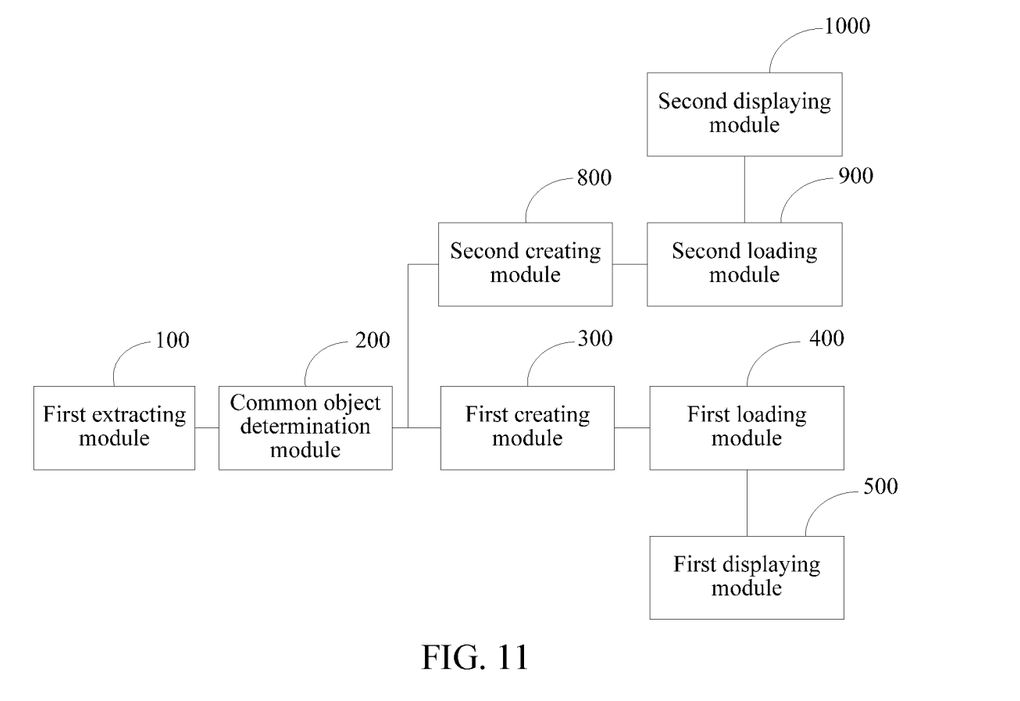
FIG. 11 illustrates another structural block diagram of an apparatus for displaying an application message according to an embodiment of the present invention.

Optionally, FIG. 11 is yet another structural block diagram of an apparatus for displaying an application message according to the embodiment of the present invention. Referring to FIG. 5 and FIG. 11, the apparatus for displaying an application message may further include:

a second creating module 800, configured to create an application instance object corresponding to the common controller object;

a second loading module 900, configured to load and display the set UI component on an application interface by using the application instance object; and a second displaying module 1000, configured to, when the application has a new application message, display the new application message in the set UI component by pulling the new application message by the logic controller.

Figure 12:
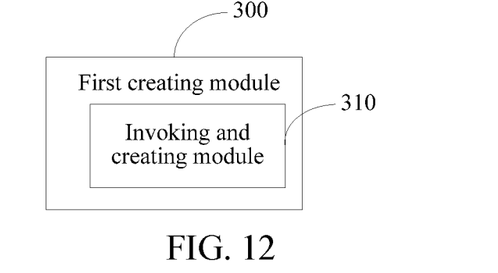
FIG. 12 illustrates a structural block diagram of a first creating module according to an embodiment of the present invention.

FIG. 12 shows an optional structure of the first creating module 300 according to an embodiment of the present invention. Referring to FIG. 12, the first creating module 300 may include: an invoking and creating unit 310, configured to create the desktop instance object corresponding to the common controller object by invoking a preset method for creating a controller.

Optionally, the second creating module may also create the application instance object corresponding to the common controller object by invoking the preset method for creating a controller.

Optionally, the preset method for creating a controller may be a new controller ( ) method. In the embodiment of the present invention, a desktop instance object or an application instance object corresponding to the common controller may be created by invoking the new controller ( ) method.

In the apparatus for displaying an application message according to an embodiment of the present invention, a logic controller that controls application message sending and receiving may be extracted from an application, the logic controller is determined as a common controller object of the application and a desktop, and to display an application message on the desktop, only a desktop instance object corresponding to the common controller object needs to be created, and by using the desktop instance object, a set UI component is loaded and displayed on the desktop, and when the application has a new application message, by pulling the new application message by the logic controller, the new application message is displayed in the set UI component. As a result, the new application message is displayed on the desktop. Compared with conventional methods that a user needs to manually switch to an application interface to display an application message, in embodiments of the present invention, when an application has a new application message, the new application message may be displayed on the desktop without any switching operation, which significantly simplifies the user operation and reduces power consumption of a terminal device. The embodiment of the present invention enables a user to view a new application message on the desktop more conveniently, and reduces power consumption of the terminal device.

An embodiment of the present invention further provides a terminal device, where the terminal device may include the apparatus for displaying an application message described above. For the description of the apparatus for displaying an application message, refer to the description of the corresponding part above, which is not repeated again herein.

Figure 13:
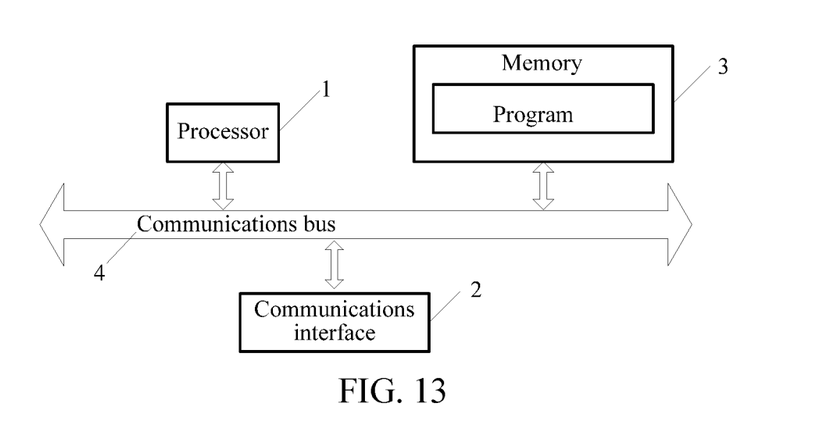
FIG. 13 illustrates a structural block diagram of hardware of a terminal device according to an embodiment of the present invention.

FIG. 13 shows a structural block diagram of hardware of a terminal device according to an embodiment of the present invention, where the terminal device may be a smart phone, a tablet, a notebook computer, and the like. Referring to FIG. 13, the terminal device may include: a processor 1, a communications interface 2, a memory 3, and a communications bus 4. The processor 1, the communications interface 2, and the memory 3 communicate with one another by using the communications bus 4.

Optionally, the communications interface 2 may be an interface of a communications module, such as an interface of a GSM module.

The processor 1 is configured to execute a program.

The memory 3 is configured to store the program.

The program may include program code, and the program code includes computer operating instructions.

The processor 1 may be a central processing unit (CPU), or application specific integrated circuit (ASIC), or one or more integrated circuits configured to implement embodiments of the present invention.

The memory 3 may include a high-speed RAM memory, or may further include a non-volatile memory, for example, at least one disk memory.

The program may specifically be configured to:

extract a logic controller that controls application message sending and receiving from an application;

determine the extracted logic controller as a common controller object of the application and a desktop;

create a desktop instance object corresponding to the common controller object; and load and display a set UI component on the desktop by using the desktop instance object, and when the application has a new application message, display the new application message in the set UI component by pulling the new application message by the logic controller.

It should be noted that the embodiments in the specification are all described in a progressive manner. Description of each of the embodiments focuses on differences from other embodiments, and reference may be made to each other for the same or similar portions among respective embodiments. The apparatus disclosed by the embodiments corresponds to the method disclosed by the embodiments, and therefore is only briefly described, and reference may be made to the description of the method.

A person skilled in the art may further understand that, in combination with the examples described in the embodiments disclosed in the specification, units and algorithm steps may be implemented by electronic hardware, computer software, or a combination of electronic hardware and computer software. In order to clearly illustrate that hardware and software are interchangeable, compositions and steps of each example are generally described in accordance with functions. Whether these functions are executed as hardware or software depends upon the particular application and design constraint conditions of the technical solutions. A person skilled in the art may use different methods to implement the described functions for each particular application, but it should not be considered that the implementation goes beyond the scope of the present invention.

Steps of the method or algorithm described with reference to the embodiments disclosed in the specification may be implemented by hardware, software modules executed by a processor, or a combination of software modules executed by a processor and hardware. The software modules may be stored in a random access memory (RAM), a memory, a read-only memory (ROM), an electrically programmable ROM, an electrically erasable programmable ROM, a register, a hard disk, a removable disk, a CD-ROM, or a storage medium of any other forms known by a person skilled in the art.

The above description of the disclosed embodiments enables a person skilled in the art to implement or use the present disclosure. Various modifications to these embodiments are obvious to a person skilled in the art. The general principle defined in the disclosure may be implemented in other embodiments without departing from the spirit or scope of the present disclosure. Thus, the present invention is not intended to be limited to the embodiments shown herein but shall be defined by the widest scope consistent with the principles and novel features disclosed herein.

What is claimed is:

1. A method for displaying an application message on a terminal device implemented by a processor, comprising:
   before receiving the application message:
      obtaining a logic controller from an application, wherein the logic controller controls application message sending and receiving from the application, and the logic controller is configured to initiate a network request, pulls an application message, and refreshes and displays the pulled application message on a UI layer;
      determining that the logic controller of the application is applicable to a desktop; and
      extracting a user interface from the application; and
   when receiving the application message:
      loading and displaying user interface extracted from the application on the desktop, and displaying the application message in the user interface extracted from the application by pulling the application message by the logic controller,
      wherein the desktop and the application share the logic controller, and the user interface extracted from the application displayed on the desktop controls the sending and the receiving of the application message by calling the logic controller, and
      the application message is displayed on the desktop of the terminal device in the user interface extracted from the application without switching to the application.

2. The method according to claim 1, wherein the displaying the application message in the user interface extracted from the application by pulling the application message by the logic controller comprises:
   performing data exchange with a network background by using a network component, and when the application message exists, pulling the application message by the logic controller, refreshing and displaying the application message in the user interface extracted from the application by a user interface refreshing controller.

3. The method according to claim 1, wherein after the loading and displaying the user interface extracted from the application on the desktop, the method further comprises:
   displaying a functional key corresponding to an interface for refreshing application messages.

4. The method according to claim 3, the displaying the application message in the user interface extracted from the application by pulling the application message by the logic controller comprises:
   when the functional key is triggered, triggering the logic controller to pull the application message from a network, and after the application message is pulled, displaying the pulled application message in the user interface extracted from the application.

5. The method according to claim 1, comprising:
creating an application instance object corresponding to the logic controller; and
loading and displaying the user interface extracted from the application on an application interface by using the application instance object, and when the application has the application message, displaying the application message in the user interface extracted from the application by pulling the application message by the logic controller.

6. The method according to claim 1, wherein the displaying the application message in the user interface extracted from the application by pulling the application message by the logic controller comprises:
performing data exchange with a network background by using a network component, and when the application message exists, pulling the application message by the logic controller, refreshing and displaying the application message in the user interface extracted from the application by a user interface refreshing controller.

7. The method according to claim 1, wherein after the loading and displaying the user interface extracted from the application on the desktop, the method further comprises:
displaying a functional key corresponding to an interface for refreshing application messages.

8. The method according to claim 1, comprising:
creating an application instance object corresponding to the logic controller; and
loading and displaying the user interface extracted from the application on an application interface by using the application instance object, and when the application has the application message, displaying the application message in the user interface extracted from the application by pulling the application message by the logic controller.

9. A terminal device for displaying an application message, comprising:
a memory; and
one or more processors coupled to the memory, wherein the one or more processors are configured to:
before receiving the application message:
obtain a logic controller from an application, wherein the logic controller controls application message sending and receiving from the application, and the logic controller initiates a network request, pulls an application message, and refreshes and displays the pulled application message on a UI layer;
determine that the logic controller of the application is applicable to a desktop; and
extracting a user interface from the application;
when receiving the application message:
load and display the user interface extracted from the application on the desktop; and
display the application message in the user interface extracted from the application by pulling the application message by the logic controller,
wherein the desktop and the application share the logic controller, and the user interface extracted from the application on the desktop controls the sending and the receiving of the application message by calling the logic controller, and the application message is displayed on the desktop of the terminal device in the user interface extracted from the application without switching to the application.

10. The terminal device according to claim 9, wherein the one or more processors are further configured to perform data exchange with a network background by using a network component, and when the application message exists, display the application message in the user interface extracted from the application by pulling the application message by the logic controller and by refreshing the application message by a user interface refreshing controller.

11. The terminal device according to claim 9, wherein the one or more processors are further configured to, after the user interface extracted from the application is loaded and displayed on the desktop, display a functional key corresponding to an interface for refreshing application messages.

12. The terminal device according to claim 11, wherein the one or more processors are further configured to, when the functional key is triggered, trigger the logic controller to pull the application message from a network, and after the application message is pulled, display the pulled application message in the user interface extracted from the application.

13. The terminal device according to claim 9, wherein the one or more processors are further:
configured to create an application instance object corresponding to the logic controller;
configured to load and display the user interface extracted from the application on an application interface by using the application instance object; and
configured to, when the application has the application message, display the application message in the user interface extracted from the application by pulling the application message by the logic controller.

14. A non-transitory computer readable storage medium having stored therein one or more instructions, which, when executed by a terminal device, cause the terminal device to:
before receiving an application message:
obtain a logic controller from an application, wherein the logic controller controls application message sending and receiving from the application, and the logic controller initiates a network request, pulls an application message, and refreshes and displays the pulled application message on a UI layer;
determine that the logic controller of the application is applicable to a desktop; and
extracting a user interface from the application;
and
when receiving the application message:
load and display the user interface extracted from the application on the desktop, and display the application message in the user interface extracted from the application by pulling the application message by the logic controller,
wherein the desktop and the application share the logic controller, and the user interface extracted from the application on the desktop controls the sending and the receiving of the application message by calling the logic controller, and
the application message is displayed on the desktop of the terminal device in the user interface extracted from the application without switching to the application.

* * * * *